Figure 3:
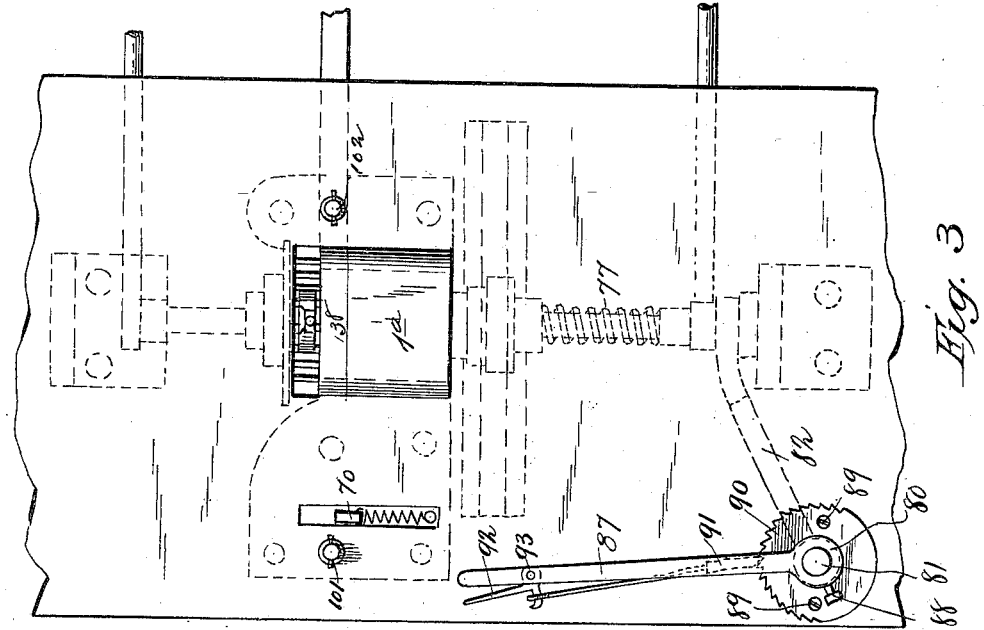

No. 644,899. Patented Mar. 6, 1900.
G. W. CULVER.
MAIL BAG CATCHER AND DELIVERER.
(Application filed May 25, 1899.)
(No Model.) 5 Sheets—Sheet 1.
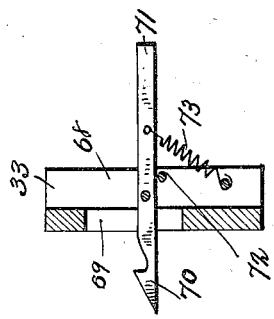
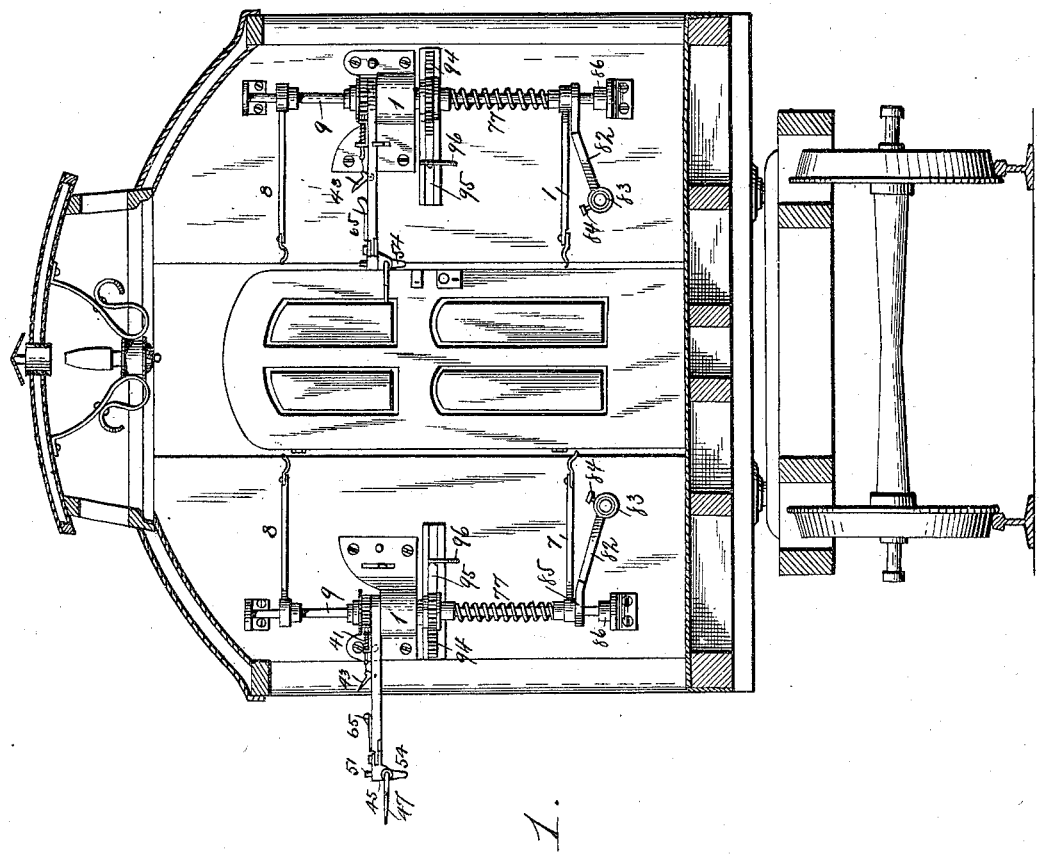
WITNESSES:
Franck L. Ouvrand.
A. G. Miller
Geo. W. Culver
INVENTOR
BY
W. J. Fitzgerald
ATTORNEYS.

No. 644,899. Patented Mar. 6, 1900.
G. W. CULVER.
MAIL BAG CATCHER AND DELIVERER.
(Application filed May 25, 1899.)
(No Model.) 5 Sheets—Sheet 2.

WITNESSES:
Franck L. Ourand.
A. G. Miller.

INVENTOR.
Geo. W. Culver

BY
W. T. Fitzgerald & Co.
ATTORNEYS.

No. 644,899. Patented Mar. 6, 1900.
G. W. CULVER.
MAIL BAG CATCHER AND DELIVERER.
(Application filed May 25, 1899.)
(No Model.) 5 Sheets—Sheet 3.
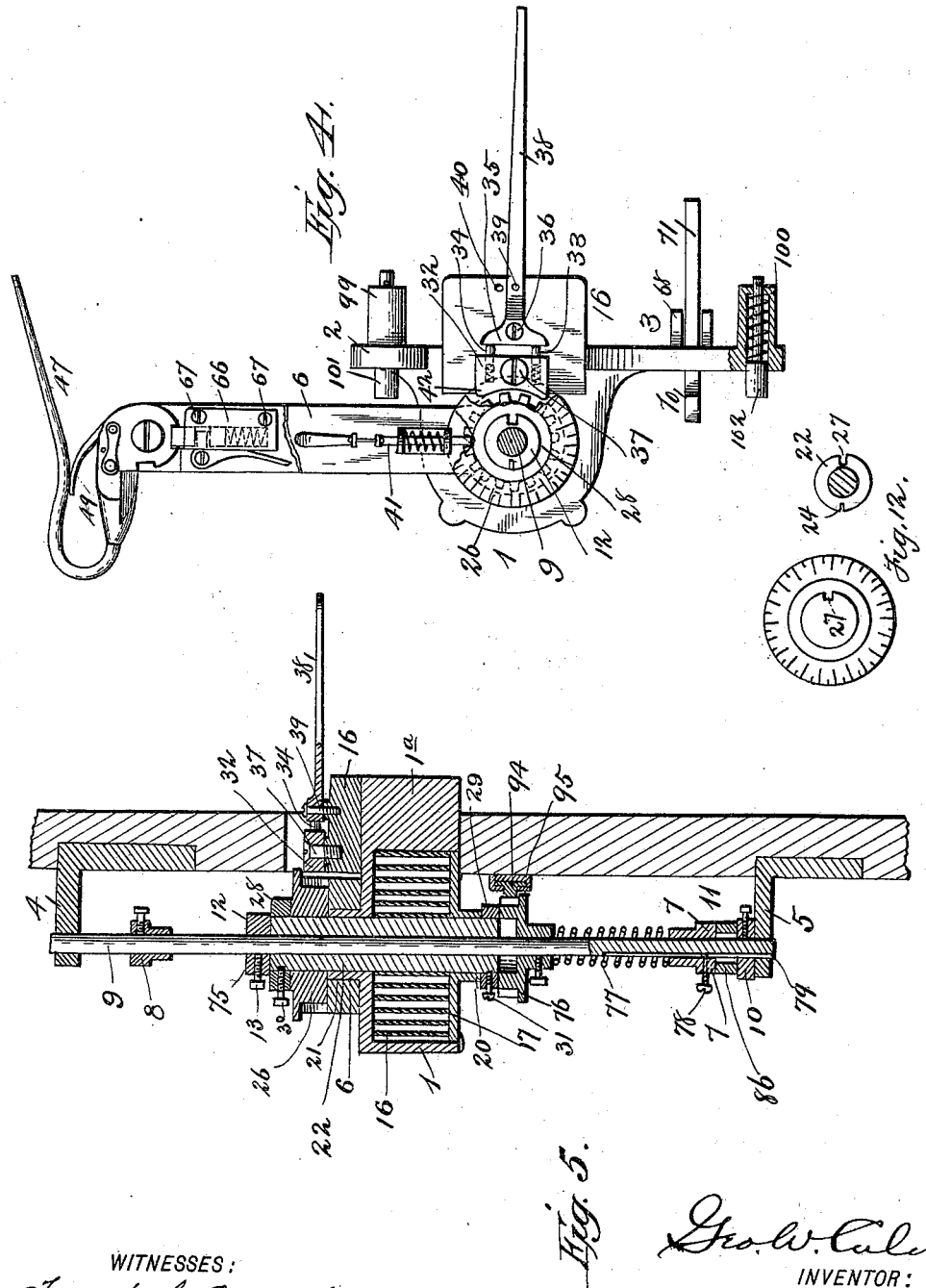

No. 644,899. Patented Mar. 6, 1900.
G. W. CULVER.
MAIL BAG CATCHER AND DELIVERER.
(Application filed May 25, 1899.)
(No Model.) 5 Sheets—Sheet 4.
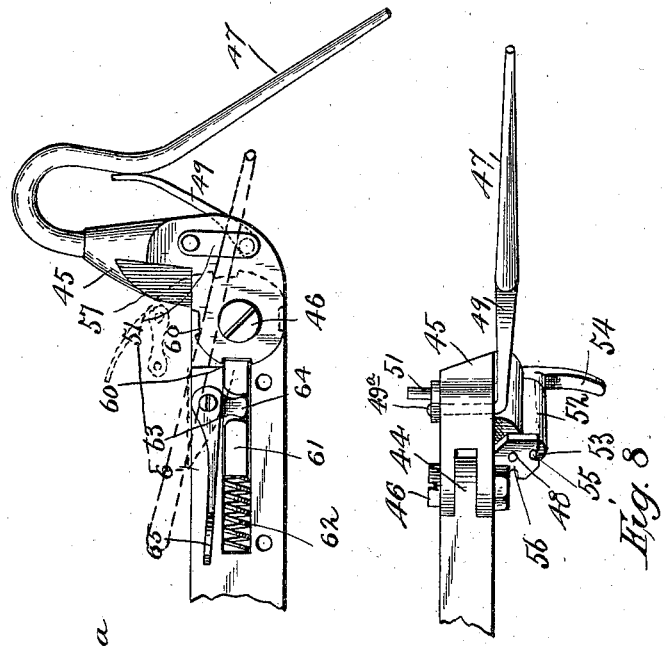
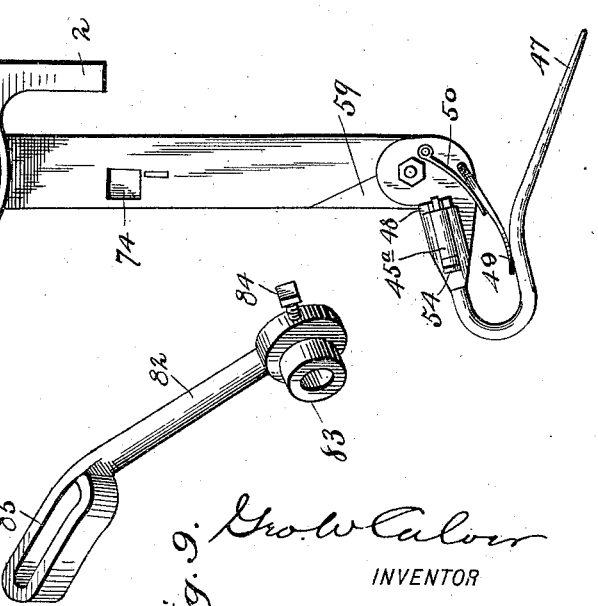
WITNESSES:
Franck L. Ourand
A. G. Miller
INVENTOR
Geo. W. Culver
BY
W. J. Fitzgerald
ATTORNEYS.

No. 644,899. Patented Mar. 6, 1900.
G. W. CULVER.
MAIL BAG CATCHER AND DELIVERER.
(Application filed May 25, 1899.)
(No Model.) 5 Sheets—Sheet 5.

WITNESSES:
Franck L. Ourand.
A. G. Miller.

INVENTOR:
Geo. W. Culver
BY
W. T. Fitzgerald
ATTORNEYS.

United States Patent Office.

GEORGE WHITEING CULVER, OF OGDEN, UTAH.

MAIL-BAG CATCHER AND DELIVERER.

SPECIFICATION forming part of Letters Patent No. 644,899, dated March 6, 1900.

Application filed May 25, 1899. Serial No. 718,207. (No model.)

*To all whom it may concern:*

Be it known that I, GEORGE WHITEING CULVER, a citizen of the United States, residing at Ogden, in the county of Weber and State of Utah, have invented certain new and useful Improvements in Mail-Bag Catchers and Deliverers; and I do hereby declare the following to be a full, clear, and exact description of the invention, such as will enable others skilled in the art to which it appertains to make and use the same.

My invention has relation to mail-bag catchers, the object being to provide a device which will be reliably efficient in meeting all the requirements of a mail-bag catcher and deliverer adapted to be used on fast mail-trains. The requirements of such a device are so many in order to meet the constantly-varying conditions incident to such service that it has been found a very difficult matter to provide a device which will give reasonable satisfaction under all these conditions.

In using the ordinary rigid hook in receiving mail-bags the mail-bag is subjected to a very sudden and severe jerk calculated in some instances to do damage to its contents. This is especially true if the train happens to be running very fast. A pivoted arm, provided with a suitable hook on its outer end and adapted to be swung out in a position to engage the mail-bag and swing it into the car, (the inertia of the mail-bag and its contents being utilized for this purpose,) has also proved unsatisfactory, as the mail will always be swung around against the inner wall of the car with a tremendous slam, and if the operator should fail to be on his guard at the station where the mail is taken on and should be standing in the path of the arm the lever, with its load of mail, is liable to strike him with such violence as to inflict fatal injuries.

It is apparent that an arm which will yieldingly receive the mail-bag is very desirable, because it prevents the evil effects of a sudden shock. There are, however, such constant variations in the rate of speed at which even the same train runs at different times and in different places, to say nothing of the varying weights of mail-bags to be acted upon, that the necessity arises of having an arm to which can be imparted any desired degree of resistance to the load to be caught and which shall at the same time be under the perfect control of the operator, so that this degree of resistance can be instantly varied at his pleasure to meet any new or sudden change of circumstance that may arise. For instance, a very light mail-bag will require great resistance provided the train is running at a very high rate of speed, whereas a much heavier bag would require less resistance provided the train should be running slowly. To meet all these requirements, my aim has been to provide a mail-bag catcher with a swinging arm adapted to extend outwardly from the door of the car and engage the mail-bag, means being provided whereby any desired degree of tension may be imparted to said arm to meet any and all of the requirements above suggested. In addition to this my device, as already intimated, embraces means for delivering mail at the same time it is receiving.

I believe that I have succeeded in producing mechanism by means of which mail may be yieldingly received and delivered, and yet the inertia thereof sufficiently resisted that the objectionable slamming above referred to will be prevented. Another matter which should not be overlooked is that the sudden jerks and strains to which the unyielding arm is subjected in catching mail on fast trains would soon work great damage to the catching mechanism, and, as already pointed out, the strain imposed is so varied that an arm adapted to impart only a certain amount of resistance would under certain other conditions also be subjected to a damaging strain. Hence the great importance of having a mail-bag catcher constructed according to the principles of my invention, where the yielding quality can be instantly increased or diminished or entirely dispensed with, as the ever-changing requirements may demand.

In the accompanying drawings, forming a part of this application, and in which the same numerals refer to the same parts throughout all the varying figures of the drawings, I have endeavored to show means whereby the principles embraced in my invention may be applied to use; yet I do not desire to be confined to the exact showing herein made, but claim protection on all that comes clearly within the spirit and scope of my invention.

Figure 2:
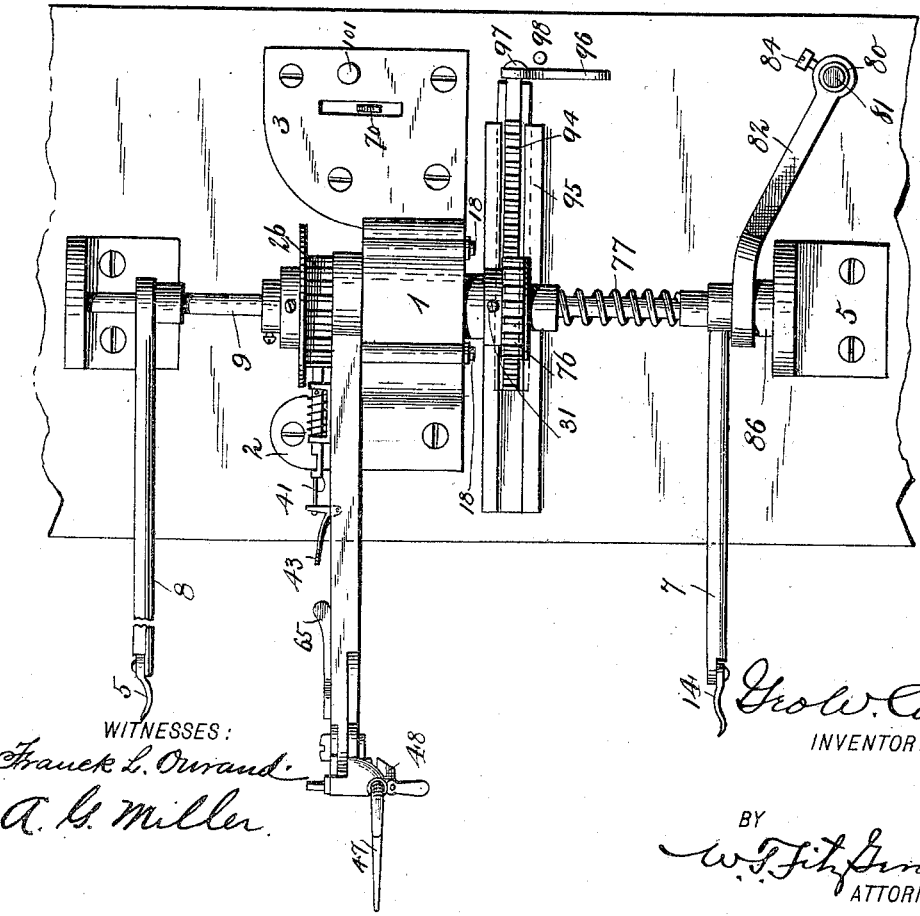
Figure 11:
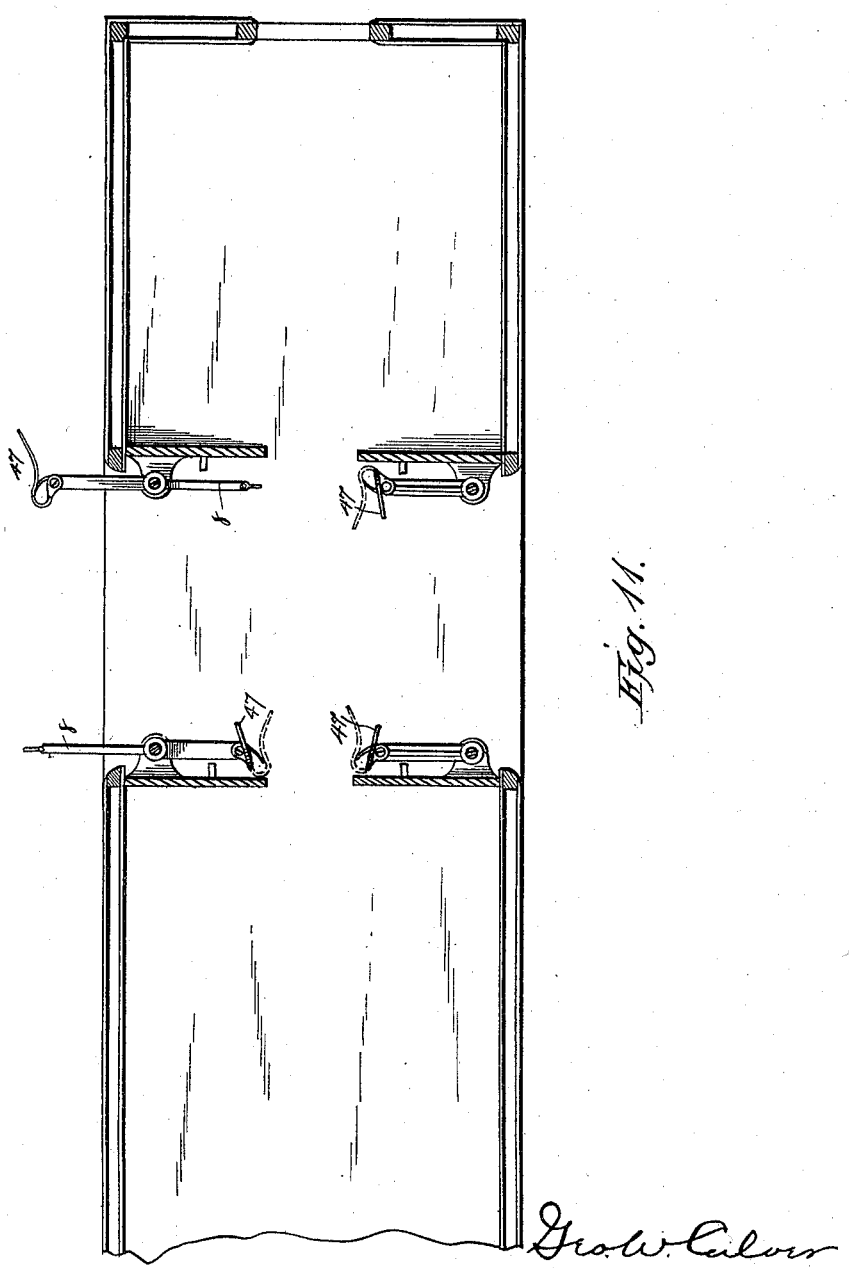

Referring to the drawings, Figure 1 shows a sectional view of a car provided with my improved mail catchers and deliverers, one of said catchers being shown in position to engage the mail-bag, the other one being folded in as it appears when not in use. Fig. 2 illustrates my device in the position it occupies when both catching and delivering mail at the same time. Fig. 3 shows the reverse side of Fig. 2. Fig. 4 is a top plan view of the receiving-arm and some of the adjacent parts operatively connected therewith, certain parts above said adjacent parts being removed. Fig. 5 is a central vertical section of Fig. 2, taken on a plane parallel with the longitudinal extent of the car. Fig. 6 is a bottom plan view of the receiving-arm and certain parts adjacent to the bottom thereof, the cap being removed from the barrel which contains the coiled spring employed to impart resistance to said arm. Fig. 7 is a top plan view of the outer end of the receiving-arm, showing the spring which controls the securing-pawl. Fig. 8 is a side elevation of the forward side of Fig. 7. Fig. 9 is a perspective view of the tension-lever used in connection with the lower delivering-arm of my device. Fig. 10 illustrates the latch employed to engage the receiving-arm of my device when not in use. Fig. 11 is a plan view of a car provided with my mail catchers and deliverers, the two on the left side of said car being swung out in operative position, while the two on the right side are swung inwardly and out of use. Fig. 12 is a top plan view of the combined ratchet-wheel and dial and the sleeve, the two parts being separated that they may be more clearly illustrated.

As appears from Fig. 11, I prefer to provide a car with four mail catching and delivering devices. While the catcher and deliverer both together constitute one piece of mechanism, yet, as will hereinafter be made apparent, they both operate independently of each other. The car in said figure is supposed to be traveling in the direction of the arrow, and when the device at the front side of the left-hand door has its receiving-arm thrown out in position to catch the bag of mail its delivering-arms are thrown inward, as illustrated, and are out of use. If, however, it is desired to deliver a bag of mail at the same time and place that one is being received, the delivering-arms of the device at the rear side of the same door are employed for this purpose, and vice versa.

Standing alongside the railroad-track on suitable platforms are two devices exactly similar in construction to those on board the car and which coöperate therewith. If the car illustrated in Fig. 11 were running in the opposite direction from that indicated by the arrow and was approaching a station at which mail was both to be received and delivered, the two devices now shown in operative position would be reversed—that is, the receiving-arm of the one which is folded back inside the car would be turned outwardly and its delivering-arms would be folded in, whereas the other one would have its delivering-arms extending out at what would then be the rear side of the door and its receiving-arm folded inwardly. Hence it will appear that the two devices shown on the right side of the car as it now stands would be unnecessary on single-track railroads were it not for the fact that the car in making a return trip may have been turned around. It is also further apparent that if there be two catchers on each side of the railroad-track in that case there would be no necessity of but two of the devices inside the car instead of four, as herein shown, and these devices could be located one at the front side of one of the doors and the other at the rear side of the same door.

My mail-bag catcher and deliverer embraces the spring-box 1, having the integral ears 2 and 3, which together with the brackets 4 and 5 afford means for securing it to a suitable support, which in the present instance consists of a partition in the car. As already stated, my invention embraces in one device means for both catching and delivering mail and is so constructed that the mechanism employed to form either operation works entirely independent of that of performing the other. The receiving-arm 6, employed in catching mail, is supported by the spring-box 1, while the two arms 7 and 8, employed to hold the bag to be delivered, are carried by the central shaft 9, which has the collar 10 rigidly attached near its lower end by the set-screw 11, Fig. 5, and the collar 12, located immediately above the parts resting upon the spring-box 1, also rigidly attached by the set-screw 13. By means of these two collars the said shaft and whatever load may be imposed upon it are supported by the lower bracket 5 and the spring-box 1. The delivering-arms 7 and 8 are provided at their inner ends with suitable collars having bores adapted to receive the shaft 9 and are preferably secured to said shaft by set-screws. The extreme ends of the shaft 9 are received by apertures in the brackets 4 and 5, and being thus received all lateral movement of said shaft is prevented. At the extreme outer ends of the receiving-arms 7 and 8 are the bag-hooks 14 and 15, pivotally secured to said arms preferably by set-screws and capable of a certain amount of horizontal movement around said pivots. The lower hook 14 has an upward bend in it while the upper hook 15 has a downward bend. These bent portions are adapted to engage handles or rings attached to the mail-bags at the top and bottom, whereby the bags to be delivered are held taut between the aforesaid hooks. The set-screws securing these hooks are screwed home with sufficient binding force that it will require a considerable amount of horizontal strain upon the mail-bag which is suspended between them to cause them to yield laterally. The resistance of the atmosphere upon a bag swung out at the door of the car in a position to be delivered will not be sufficient to overcome this force.

The spring-box 1 is provided with the inwardly-extending portion 1ᵃ, which extends through a suitable aperture in the partition supporting the device and rests upon the bottom of said aperture, and thereby supports a part of the strain imposed upon the device when in operation. The part 1ᵇ is practically an upward extension or continuation of the part 1ᵃ and may be made either integral therewith or rigidly attached thereto, as will be found most expedient in manufacturing the machines. The spring-box 1 carries the coiled spring 16. The lid 17 of the box is secured at the under side thereof by screws. The opening in the box is circular, as clearly illustrated in Fig. 6, and the main body of the lid is received into the circular recess, as illustrated in Fig. 5; but the lid is provided with integral ears which overreach the edge of said box, and through these ears are entered the screws 18, Fig. 2, which coöperate with the threaded aperture 19, Fig. 6, to secure the lid in operative position. The lid is further provided with the downwardly-extending collar 20. This lid serves the purpose of securely housing the coiled spring 16 and reliably holding it it operative position. The top of the spring-box 1 is also provided with an upwardly-extending collar 21, which receives the arm 6, said arm being provided at its inner end with a circular aperture of sufficient size to be snugly received upon said collar, which forms the pivotal point around which the arm swings. The box 1 is further provided with a central vertical bore extending through the two collars thereof and adapted to snugly receive the spring-engaging sleeve 22. The sleeve is provided with the longitudinal grooves 23 and 24, the latter of which engages the extreme inner end of the coiled spring, as clearly illustrated in Fig. 6, while the outer end of said spring is engaged by a suitably-shaped cut-away portion 25 in the portion 1ᵃ of said box adjacent to the recess containing said spring.

From Fig. 6 it is apparent that the spring 16 when in operative position will resist the rotation of the sleeve 22. From Fig. 5 it will be observed that the top of the receiving-arm 6 is flush with the top of the collar 21, forming an even surface therewith, and resting upon this surface is the ratchet-wheel 26, snugly received by the sleeve 22. The top of this wheel is provided with an integral portion of enlarged diameter which constitutes a dial, the top side thereof being provided with suitable graduations, as illustrated in Fig. 12. The aperture of the combined ratchet-wheel and dial carries the tongue or integral key 27, which when in operative position is received into the groove 23 of the sleeve 22, Fig. 12. Hence it is apparent that whenever the said ratchet-wheel is rotated the sleeve 22 will also rotate therewith and that tension will be imparted to the spring 16.

The sleeve 22 is secured against vertical movement by the collar 28, located at the top thereof, and the collar 29 at its bottom, both of said collars being rigidly secured to said sleeve by set-screws 30 and 31, respectively, as clearly illustrated in Fig. 5.

Located upon the top of the portion 1ᵇ of the spring-box, on the inner side thereof adjacent to the ratchet-wheel 26, is the ratchet-block 32, having two small apertures or bores near either end on the outer side thereof, as shown by dotted lines. Each of these bores, in addition to containing a small spring, also shown in dotted lines, contains the pins 33 and 34, which bear against said springs at their inner ends, while their outer ends bear against the lateral extensions of the lever 35, which controls the ratchet-block 32 and is pivotally secured to the block 1ᵇ by the screw 36, the ratchet-block 32 also being pivotally secured at its center by the screw 37.

The handle 38 of the lever 35 is provided at its under side and near its pivotal point with the downwardly-extending pin 39, which is adapted to coöperate with the bore 40 when the lever is moved in that direction, and when it has engaged said bore 40 it forms a stop for said lever at a point which brings the ratchet-block 32 into nice operative engagement with the ratchet-wheel 26.

The features just referred to are clearly illustrated in Fig. 4, from reference to which it will also be seen that the receiving-arm 6 carries the spring-actuated ratchet 41, adapted to coöperate with the ratchet-wheel 26 in such a way that when said arm is moved to the left it will engage said ratchet-wheel and carry it around with it, and will thereby impart tension to the spring 16, as already explained. Just before beginning this operation, however, the handle 38 of the lever 35 should be moved forward until the pin 39 engages with the aperture 40, which will bring the forward point 42 of the ratchet-block 32 into engagement with the cogs of the wheel 26 and will prevent any backward movement of said ratchet-wheel when the ratchet 41 is disengaged therefrom or when the arm is moved in the opposite direction, though it is apparent that, due to the springs carried by the ratchet-block 32, said block will not prevent the forward movement of the ratchet-wheel as the arm 6 is moved to the left, but will ride over the cogs, only engaging them when the wheel attempts to move in the opposite direction. When the arm 6 has been moved as far to the left as is convenient in the operation of imparting tension to the spring, it may be again moved to the right, as the inclined end of the ratchet 41 will ride over the cogs of the wheel and for that reason will not resist such movement, the ratchet-block 32 in the meantime, as already explained, holding the take-up that has been imparted to the spring. The moment the lever is moved again toward the left the ratchet will again engage one of the cogs of the wheel and further tension will thereby be imparted to the spring. This operation can be repeated until any desired tension is imparted to the spring, which will always be determined by the weight of the mail-bag to be caught by the arm and by the speed at which the train happens to be running at any given station. When sufficient tension has been imparted to the spring, the pin 38 and the lever 39 will be moved backward out of engagement with the aperture 40 into the position shown in the figure referred to, and the ratchet 41 will hold the tension that has already been imparted to the spring, and which through said ratchet imparts power of resistance to the arm 6. The dial readily indicates the amount of tension that has been imparted to the spring at any given time.

It will be seen from Fig. 2 that the ratchet 41 is controlled by the thumb-lever 43, so that if it is desired to release the tension of the spring and the consequent resistance imparted to the arm 6, it may be instantly done by moving the thumb-lever 43 downwardly, which will disengage the ratchet 41 from the wheel 26 and allow the spring to uncoil itself. It will thus be seen that the arm 6 may have any desired degree of resistance imparted to it or may be left to swing entirely free, just as the operator may will. The arm 6 is reduced in thickness at its outer end to form the tongue 44, which is pivotally received between the two ears of the pivoted hook-block 45, the union between the two being formed by the bolt 46. Said block is substantially L-shaped, and when in its normal position the longer arm thereof extends rearwardly substantially at a right angle to the reach of the receiving-arm 6, the shorter arm of the L forming the two ears, between which the extremity of the arm 6 is received. This rearwardly-extending portion is enlarged on its under side, and this enlarged portion 45$^a$ is provided with a longitudinal bore which rotatably receives the inner end of the gooseneck-hook 47, the extreme point of its inner end passing through said bore and having rigidly secured thereto the head or block 48, which secures said hook and prevents it from becoming disengaged from the block 45$^a$. In the throat of the hook 47 is located the inwardly-extending tongue 49, normally held in position by the leaf-spring 50, the outer end of the tongue 49 being bent upwardly substantially at a right angle to the main body thereof, and this bent end is received by a vertical aperture in the block 45 and extends to the top thereof, as illustrated by dotted lines in Fig. 8. The office of this tongue is to normally prevent a mail-bag from coming out of the hook 47 when it has been received thereby, though said tongue is so disposed that it will offer but little resistance to the bag when it enters. When it is desired, however, to remove a bag of mail that has been caught by the hook, it is necessary to throw the tongue 49 backward, in order that the bag may be easily removed. This movement is slightly resisted by the spring 50, and in order that this resistance may be easily overcome, the upwardly extending and protruding end 49$^a$ of the tongue 49 is provided with a small crank 51, by which said tongue is easily controlled.

The enlarged portion 45$^a$ terminates in the semicircular portion 52, which has a longitudinal bore adapted to receive the pin 53, to the outer end of which is rigidly attached the handle 54, the inner end of said pin normally engaging the apertures 55 in the securing-block 48. The pin 53 is held normally inward in engagement with the apertures 55 by a spring (not shown) surrounding said pin within the semicircular portion 52. When the arm 6 is out of use and is swung around within the car, the pin 53, by means of the handle 54, may be drawn out of engagement with the apertures 55 in block 48, which will permit the hook 47 to be moved upwardly, so that it will occupy a vertical plane instead of a horizontal one, as when in use, and when in this position the pin 53 will engage the aperture 56, Fig. 8, and will hold said hook in the position indicated.

As will be seen from Fig. 7, the free end of the pivoted block 45 may be moved backwardly, said block being provided on its top side with the cut-away portion 57, so that this movement will not be resisted by the arm 6 until the shoulder 58 of said block has come in contact therewith, and in order that the enlarged portion 45$^a$ on the under side of said block may not also come in contact with the arm 6 and resist the above backward movement said arm is also provided on its under side with the cut-away portion 59, as illustrated. When the block 45 is moved backwardly, with the shoulder 58 resting against the arm 6 and the hook 47 occupying a vertical plane, the hook will be snugly out of the way, as illustrated in Fig. 7 by dotted lines.

The upper ear of the block 45 is provided with the notches 60, which are adapted to coöperate with the sliding bar 61, by means of which the hook 47 may be firmly held in operative position or folded back, as just described. Said bar 61 is held in its operative position by the spring 62. It is provided on its upper side with the cut-away portion 63, which coöperates with the shorter end 64 of the pivoted lever 65, by means of which said bar is readily controlled. The spring 62 and the bar 61 are received within a suitable cut-away portion on the upper side of the receiving-arm 6 and are securely held in this position by the plate 66, which is secured to said arm by the screws 67. (See Figs. 4 and 7.)

The ear 3 of the spring-box is provided on its rear side with the two parallel flanges 68 and the aperture 69 between said flanges. Pivotally secured between these two flanges is the horizontal latch 70, which extends inwardly through aperture 69 and whose outer end 71 extends outwardly beyond the supporting wall or partition. The movement of the latch 70 is limited by the stop-pin 72, the latch being controlled by the spring 73, one end of which is suitably secured to the flanges 68 and the other end to the latch.

The arm 6 is provided on the under side thereof, Fig. 6, with a cut-away portion 74, adapted to coöperate with the said latch, so that when the arm is swung around against the wall the latch will engage the said cut-away portion 74 and the arm will be securely held in this position. When it is desired to release the arm and swing it around into operative position again, it is only necessary to lift the end 71 of the latch 70 sufficiently to overcome the tension of the spring 73, which operation will disengage the aperture in the arm 6, leaving it free to be moved at the will of the operator. As already described, the shaft 9 supports the part of my device employed in delivering mail. In addition to being supported by the brackets 4 and 5, as already fully specified, said shaft also passes through a vertical central bore in the sleeve 22. All longitudinal movement of this shaft is prevented by the collar 75, rigidly secured thereto immediately above the parts supported by the spring-box, and the cog-wheel 76, also rigidly secured thereto immediately below the collar 29.

When it is desired to deliver a bag of mail, it is suspended between the hooks 14 and 15, when said hooks are swung outwardly through the door of the car in such position that the mail-bag will be grasped by the receiving-arm of a similar device located alongside a railroad-track, as already set forth. When the stationary catchers grasp the mail-bag, the hooks 14 and 15 will move backward on their pivots and will permit the mail-bag to slip off; but in order that the bag may not be drawn from the hooks by the force of the atmosphere caused by a rapid motion of the train it is desirable that the bag should be held strongly taut. For this reason the distance between the arms 7 and 8 is somewhat greater than the length of the mail-bags to be used, so that when a mail-bag is attached to the arms for delivery the arms must be drawn somewhat nearer together, and to this end the arm 7 is movably mounted upon the shaft 9 and the spring 77 is interposed around said shaft between said arm 7 and the cog-wheel 76 and normally forces said arm downwardly. It will therefore be seen that the arm 7 can be made to approach the arm 8 by moving it upward sufficiently to overcome the force of the spring. Hence the arm 7 is not rigidly secured to the shaft 9, but is provided with a set-screw 78, whose inner end works easily in the groove 79, located at the lower end of said shaft, thereby preventing any rotary movement of the arm 7 on the shaft, but not preventing longitudinal movement thereon.

In order that mail to be delivered may be easily and conveniently attached in position for delivery to the bag-hooks 14 and 15, the following controlling mechanism is provided for the lower arm 7: At a convenient distance from the lower end of the shaft 9 is the sleeve 80, Figs. 2 and 3, which passes through the supporting wall or partition, being firmly secured therein and forming a bearing for the horizontally-disposed shaft 81, which carries on its inner end the lever 82, fully illustrated in Fig. 9. This lever is provided with the collar 83 to give it larger bearing-surface upon the shaft 81, to which it is rigidly attached by the set-screw 84. The outer end of said lever is bent into a loop 85, inclined slightly downwardly with respect to the main body of the lever, so that when in operative position, as illustrated in Figs. 2 and 3, said loop will be disposed substantially horizontal. Said loop has parallel sides and is adapted to receive the shaft 9 immediately beneath the arm 7 and is normally forced downwardly by the action of spring 77. The collar 86 is interposed between the bracket 5 and the loop 85 to prevent said loop from being forced down into contact with said bracket. To the outer end of shaft 81, at the other side of the supporting-partition, is the operating-lever 87, Fig. 3, rigidly secured to said shaft by the set-screw 88. Interposed between said lever and the partition and fixedly attached to said partition is the ratchet-wheel 90. The lever 87 carries the spring-actuated ratchet 91. (Shown by dotted lines in Fig. 3.) Said ratchet is controlled in the usual manner by the ratchet-lever 92, pivotally connected to the handle portion of lever 87 by the pin 93. It will be observed from Fig. 3 that by pulling the lever 87 to the left the lever 82 on the other end of the same shaft will elevate the delivering-lever 7, compressing the spring 77, and the ratchet 91, engaging the cogs on the ratchet-wheel 90, will hold the parts thus acted upon in any desired position. Hence the lever 7 can be elevated to a position such that the bag to be delivered can be easily attached to the hooks 14 and 15, and when in this position the ratchet 91 is disengaged from the ratchet-wheel 90 by a proper manipulation of the ratchet-lever 92, which at once permits the spring 77 to exert its force to move the arm 7 downwardly, whereby a sufficient pull is brought to bear on the bottom of the mail-bag to hold it securely in position for delivery. Of course it is apparent that the amount of downward pull thus imposed upon the mail-bag can be regulated by the lever 87 and its coöperating ratchet mechanism. For instance, if it is found that to entirely release the ratchet, so as to allow the spring 77 to move entirely down, imposes too much tension on the mail-bag said tension may be lessened to the desired extent by slightly elevating the loop 85 of lever 82 by a proper movement of the controlling-lever 87, which will elevate the arm 7 to the desired position. Said arm will then be secured in this position by the ratchet mechanism already explained.

It is apparent that the delivering-arms 7 and 8 may be manually swung into or out of their delivering position without special mechanism for that purpose; but that they may be more readily operated I provide the movable rack 94, held in operative position by the guideway 95, rigidly attached to the supporting-partition in any desired way. Said movable rack coöperates with the cog-wheel 76, which is rigidly attached to the supporting-shaft 9, and it is readily apparent that by a proper movement of the rack 94 the said shaft will rotate, and thereby be made to swing the arms 7 and 8 in or out, as the operator may choose.

In order that the rack 94 may be easily operated, it is provided at one end with the handle 96, which is pivotally attached thereto by the screw 97, and when not in use said handle hangs down out of the way. The stop-pin 98 indicates the point to which the rack should be withdrawn to swing the arms 7 and 8 into proper position for delivering mail.

To prevent the evil effect of the sudden stop of the arm 6 when it has been swung violently either to its forward or backward limit, the ears 2 and 3 of the spring-box 1 are provided with the integral thimbles 99 and 100, which carry the buffers 101 and 102, suitably housed in said thimbles, which also house the springs which control the said buffers. When the arm 6 is violently swung around in either direction, these buffers yieldingly receive the force of the blow and prevent damage that might otherwise arise. The buffer 102 also serves the additional purpose of forcing the arm 6 slightly forward out of engagement with the latch 70 when the aperture 74 on the under side of said arm has been engaged by said latch, so that to disengage this connection all that is necessary is to slightly elevate the handle 71 of the latch 70 and the buffer 102 does the rest.

Having fully described all the details involved in the construction of my invention and illustrated the same in the accompanying drawings, what I claim as new, and desire to secure by Letters Patent, is—

1. In apparatus for receiving and delivering mail, a box having a coiled spring, a central sleeve with which it is connected, arms for delivering the mail, branches connected therewith and retracted by said spring, all arranged as set forth.

2. In apparatus for receiving and delivering mail-pouches, a box having a coiled spring, a central sleeve with which it is connected, arms for delivering said pouches connected therewith and retracted by said spring and means to adjust the tension of the spring, all combined as set forth.

3. In apparatus for receiving and delivering mail-bags, a box having a coiled spring, a central sleeve with which it is connected, arms for delivering said bags connected therewith and means for adjusting the distance between said arms, all combined as set forth.

4. In apparatus for receiving and delivering mail-bags a box provided with a tension-spring encircling a central sleeve with which it is connected arms for delivering said bags connected therewith, means for adjusting the distance between said arms and means to hold them taut apart, all arranged as set forth.

5. In apparatus for receiving and delivering mail-pouches a box provided with a tension-spring encircling a central sleeve with which it is connected, arms for delivering said pouches connected therewith, means to adjust the distance between said arms and a spring to hold them apart, all arranged as set forth.

6. In apparatus for receiving and delivering mail-pouches, a box provided with a tension-spring, a central sleeve having recesses or grooves in which fit the ends of the spring, means to rotate said sleeve to adjust the tension of the spring, and delivery-arms connected with said box, all arranged as set forth.

7. In apparatus for receiving and delivering mail-pouches, a box provided with a tension-spring, delivery-arms spaced apart connected therewith, the lower arm being adjustable, whereby the distance between the arms may be regulated and means to operate said arms, all arranged as set forth.

8. In apparatus for receiving and delivering mail-pouches, a box provided with a tension-spring encircling a central sleeve with which it is connected, means to adjust the tension of said spring, a graduated dial to indicate said tension and delivery-arms retracted by said spring, as set forth.

9. In apparatus for receiving and delivering mail-pouches, a box provided with a tension-spring, a central sleeve provided with grooves into which fit the ends of the spring, a graduated ratchet-wheel secured to said sleeve and means to actuate said wheel whereby the tension of the spring may be adjusted, all combined as set forth.

10. In apparatus for receiving and delivering mail-pouches, a box provided with a tension-spring encircling a central sleeve with which it is connected, delivery-arms for holding a pouch, means to throw out and retract said arms and a device to retain them in their retracted position, all arranged as set forth.

11. In apparatus for receiving and delivering mail-pouches, a box provided with a tension-spring encircling a central sleeve with which it is connected, a receiving-arm connected therewith and provided with a gooseneck on its outer end, and means to actuate said arm, all arranged as set forth.

12. In apparatus for receiving and delivering mail-pouches, a box provided with a tension-spring encircling a central sleeve with which it is connected, a central sleeve having grooves into which fit the ends of said spring, a receiving-arm provided with a collar encircling said sleeve and means to actuate said arm, all arranged as set forth.

13. In apparatus for receiving and delivering mail-pouches, a box provided with a tension-spring encircling a central sleeve with which it is connected, a receiving-arm connected therewith and provided with a gooseneck at its outer end and a leaf-spring in the throat of said neck all arranged as set forth.

14. In apparatus for receiving and delivering mail-pouches, a box provided with a tension-spring, a receiving-arm terminating in a gooseneck, said neck being capable of both horizontal and vertical adjustment and means to retain it in either adjusted position, all arranged as set forth.

15. In apparatus for receiving and delivering mail-pouches, a receiving-arm terminating in a gooseneck and means for vertical and horizontal adjustment of the neck, as set forth.

In testimony whereof I affix my signature in presence of two witnesses.

GEORGE WHITEING CULVER.

Witnesses:
L. H. BECRAFT,
RALPH GRANGE.